United States Patent
Yoo et al.

(10) Patent No.: US 12,167,116 B2
(45) Date of Patent: Dec. 10, 2024

(54) DEVICE AND METHOD WITH OBJECT RECOGNITION

(71) Applicant: Samsung Electronics Co., Ltd., Suwon-si (KR)

(72) Inventors: Byung In Yoo, Seoul (KR); Youngjun Kwak, Seoul (KR); Sungyoul Park, Seoul (KR); Solae Lee, Suwon-si (KR); Hana Lee, Suwon-si (KR); Jiho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/958,564

(22) Filed: Oct. 3, 2022

(65) Prior Publication Data
US 2023/0283876 A1 Sep. 7, 2023

(30) Foreign Application Priority Data
Mar. 2, 2022 (KR) .......................... 10-2022-0026583

(51) Int. Cl.
*H04N 23/61* (2023.01)
*H04N 23/69* (2023.01)
*H04N 23/695* (2023.01)

(52) U.S. Cl.
CPC ............. *H04N 23/61* (2023.01); *H04N 23/69* (2023.01); *H04N 23/695* (2023.01)

(58) Field of Classification Search
CPC ....... H04N 23/61; H04N 23/69; H04N 23/695
See application file for complete search history.

(56) References Cited

U.S. PATENT DOCUMENTS 9,025,033 B2 5/2015 Niem et al.
10,015,406 B2 * 7/2018 Ogawa ................. G06V 40/161
(Continued)

FOREIGN PATENT DOCUMENTS

JP         6948848 B2    10/2021
KR    10-2013-0085316 A    7/2013
(Continued)

OTHER PUBLICATIONS

Korean Office Action issued on Jul. 17, 2023, in counterpart Korean Patent Application No. 10-2022-0026583 (2 pages in English, 4 pages in Korean).
(Continued)

*Primary Examiner* — Richard A Hansell, Jr.
(74) *Attorney, Agent, or Firm* — NSIP Law (57) ABSTRACT

A device and method with object recognition is included. In one general aspect, an electronic device includes a camera sensor configured to capture a first image of a scene, the camera sensor is configured to perform at least one type of physical camera motion relative to the electronic device, the at least one type of physical camera motion includes rolling, panning, tilting, or zooming the camera sensor relative to the electronic device, and a processor configured to control the camera sensor to perform a physical motion of the physical camera motion type based on detecting an object in the first image, acquire a second image captured using the camera sensor as adjusted based on the performed physical motion, and recognize the object in the second image.

17 Claims, 5 Drawing Sheets

(56) References Cited

U.S. PATENT DOCUMENTS

| | | | |
|---|---|---|---|
| 10,192,086 | B2 | 1/2019 | Powell et al. |
| 10,268,858 | B2* | 4/2019 | Todeschini ............ G06V 10/235 |
| 10,855,894 | B2 | 12/2020 | Biasini et al. |
| 11,115,599 | B2 | 9/2021 | Tkac et al. |
| 11,616,914 | B2* | 3/2023 | Hu ............................ G03B 5/00 |
| | | | 348/169 |
| 2013/0286240 | A1* | 10/2013 | Kim ........................ H04N 23/10 |
| | | | 348/222.1 |
| 2017/0280045 | A1* | 9/2017 | Nonaka ................ H04N 23/673 |
| 2018/0035075 | A1* | 2/2018 | Lee ........................ H04N 23/80 |
| 2018/0150211 | A1 | 5/2018 | Huang et al. |
| 2019/0102519 | A1 | 4/2019 | Durand |
| 2019/0178436 | A1* | 6/2019 | Mao ........................... G06T 5/70 |
| 2020/0186690 | A1* | 6/2020 | Kodama ............. H04N 23/673 |
| 2020/0357105 | A1* | 11/2020 | Shahmehri ........... G06V 10/764 |
| 2021/0067681 | A1* | 3/2021 | Li ........................ H04N 23/631 |
| 2021/0132465 | A1 | 5/2021 | Shabtay et al. |
| 2021/0319549 | A1* | 10/2021 | Bhatnagar ............. G06T 7/0008 |
| 2021/0365707 | A1* | 11/2021 | Mao ....................... G06V 10/25 |
| 2022/0036108 | A1* | 2/2022 | Zhang ................... G06V 20/62 |
| 2022/0062109 | A1* | 3/2022 | Kaintz .................. B25J 9/1656 |

FOREIGN PATENT DOCUMENTS

| | | |
|---|---|---|
| KR | 10-2033554 B1 | 10/2019 |
| KR | 10-2232517 B1 | 3/2021 |

OTHER PUBLICATIONS

Marshall, Gary. "How to scan QR codes with an Android phone." *NEXTPIT.* (2019). pp. 1-13.

Ijaz, Moazam. "What is a QR code? Mechanism and Pros." TECHENGAGE. (2021). pp. 1-11.

"QR Code Distance: What Size Should a QR Code Be in Relation to Scan Distance?" QR Code Generator. (2020). pp. 1-21.

Trpovski, Zeljen. "Geometric modifications of QR code." *2017 South Eastern European Design Automation, Computer Engineering, Computer Networks and Social Media Conference (SEEDA-CECNSM).* IEEE, (2017). pp. 1-6.

\* cited by examiner

DEVICE AND METHOD WITH OBJECT RECOGNITION

CROSS-REFERENCE TO RELATED APPLICATIONS

This application claims the benefit under 35 USC § 119(a) of Korean Patent Application No. 10-2022-0026583, filed on Mar. 2, 2022, at the Korean Intellectual Property Office, the entire disclosure of which is incorporated herein by reference for all purposes.

BACKGROUND

1. Field

The following description relates to recognition of an object.

2. Description of Related Art

Various recognition technologies use a camera for applications such as recognizing barcodes, two-dimensional codes, color-based codes, business cards, faces, and the like. In general, it has been possible to use separate applications according to the type of object to be recognized and it has been possible to use a touch screen interface to select a type of recognition module in a same application.

An application to recognize a business card, a barcode, a quick response (QR) code (or the like) in an electronic device may obtain an image corresponding to a specific business card, barcode, or QR code through an image sensor. For example, the application may then display information included in a code obtained by extracting a barcode or a QR code from the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a camera sensor configured to capture a first image of a scene, the camera sensor is configured to perform at least one type of physical camera motion relative to the electronic device, the at least one type of physical camera motion includes rolling, panning, tilting, or zooming the camera sensor relative to the electronic device, and a processor configured to control the camera sensor to perform a physical motion of the physical camera motion type based on detecting an object in the first image, acquire a second image captured using the camera sensor as adjusted based on the performed physical motion, and recognize the object in the second image.

The physical motion may include rolling, and the processor may be further may be configured to control the rolling based on alignment of the object in the first image relative to the camera sensor.

The rolling may include rotating about a roll axis corresponding to a principal axis of the camera sensor so that a first reference line of the object in the second image and a second reference line of a target area may be aligned.

The physical motion may include panning or tilting, and the processor may be further may be configured to control the panning or tilting based on a shape of the object in the first image being mismatched with a reference shape of a category corresponding to the object in the first image.

The panning may include rotating about a yaw axis of the camera sensor and the tilting may include rotating about a pitch axis of the camera sensor.

The processor may be further may be configured to control the panning or tilting so that an internal angle of a shape of the object in the second image matches a reference angle.

The physical motion may include zooming and the processor may be further may be configured to control the zooming based on a distance to a physical position of the object or a size of the object in the first image.

The zooming may include a zoom-in motion and the processor may be further may be configured to control the zoom-in motion so that an area occupied by the object in the second image may have a ratio greater than a threshold ratio of a target area.

The processor may be further may be configured to control the zoom-out motion based on determining that the object in the second image is incomplete or is partially outside of an area for object recognition.

The processor may be further may be configured to select a document or a pattern code as a category to be recognized in the first image or the second image based on an input from a user input device.

The electronic device may be a mobile computing device that may further include the camera sensor.

The mobile computing device may be a smartphone.

The electronic device may be configured to operate the camera sensor based on recognition of the object performed by the electronic device.

In one general aspect, a method is performed by an electronic device, the method includes accessing a first image of a scene captured using either a first camera may be configured to perform at least one automated camera motion or using a second camera, the automated camera motion includes rolling, panning, tilting, or zooming, performing the automated camera motion of the first camera based on a detected location and/or orientation of an object detected in the first image, accessing a second image captured using the first camera as adjusted based on the performed automated camera motion, and recognizing the object in the captured second image.

The performing of the automated camera motion may include performing rolling based on the object in the first image being misaligned relative to the first camera.

The performing of the rolling may include instructing the first camera to perform a rolling motion of rotating around a roll axis corresponding to a principal axis of the first camera so that a first reference line of the object in the second image and a second reference line become aligned.

The first image may be captured by the second camera.

The performing of the automated camera motion may include panning or tilting based on a shape of the object in the first image being mismatched with a reference shape of a category associated with the first image.

The performing of the panning or the tilting may include the first camera rotating around a yaw axis of the camera sensor or rotating around a pitch axis of the first camera.

The automated camera motion may be performed so that an internal angle of a shape of the object in the second image is a reference angle.

The automated camera motion may include zooming based on a physical distance of the object or a size of the object in the first image.

The zooming may include a zoom-in motion performed so that a ratio of an area corresponding to the object in the second is greater than a threshold.

The threshold may include a ratio of a target area.

The zooming may include instructing the first camera to perform a zoom-out motion based on a determination corresponding to a portion of the object being missing.

The first image may be captured using the second camera, and the second camera may have a wider field of view than the first camera.

The second image may be captured based on a determination corresponding to a portion of the object being absent from the first image.

The electronic device may include a smartphone and the first camera may be physically incorporated in the smartphone In one general aspect, a method is performed by a computing device that includes a steerable camera that is physically steerable relative to the computing device, the method includes detecting an object in a first image, generating a camera steering instruction for the steerable camera based on the detecting of the object in the first image, and capturing a second image of the object by steering the steerable camera relative to the computing device according to the camera steering instruction.

The first image may be captured by the steerable camera.

The generating the camera steering instruction may include detecting a feature of the object from the first image, determining an offset of the feature relative to a reference feature, and generating the camera steering instruction based on the offset.

The reference feature may include a region for recognizing objects, a reference shape, or an alignment feature.

The object in the first image may correspond to a physical object, and the method further may include generating the camera steering instruction based on a determination corresponding to a portion of the physical object not being represented in the first image.

The object in the first image may correspond to a physical object, and the method further may include generating the camera steering instruction based on a determination corresponding to the physical object not being fully represented within a sub-area of the first image.

The steering of the steerable camera may include rotating the camera about an optical axis of the steerable camera.

The object may include an encoding of information, and the method may further include decoding the information from the object in the second image.

The generating the camera steering instruction may include comparing a feature of the object in the first image to an area of the first image that corresponds to a region for object recognition.

The computing device may include a second camera that captures the first image.

The second camera may have a wider field of view than the steerable camera.

The method may include determining a change in orientation of the computing device, and the generating the camera steering instruction may be further based on the change in orientation.

In one general aspect, a non-transitory computer-readable storage medium stores instructions that, when executed by a processor, cause the processor to perform any of the methods.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Figure 1:
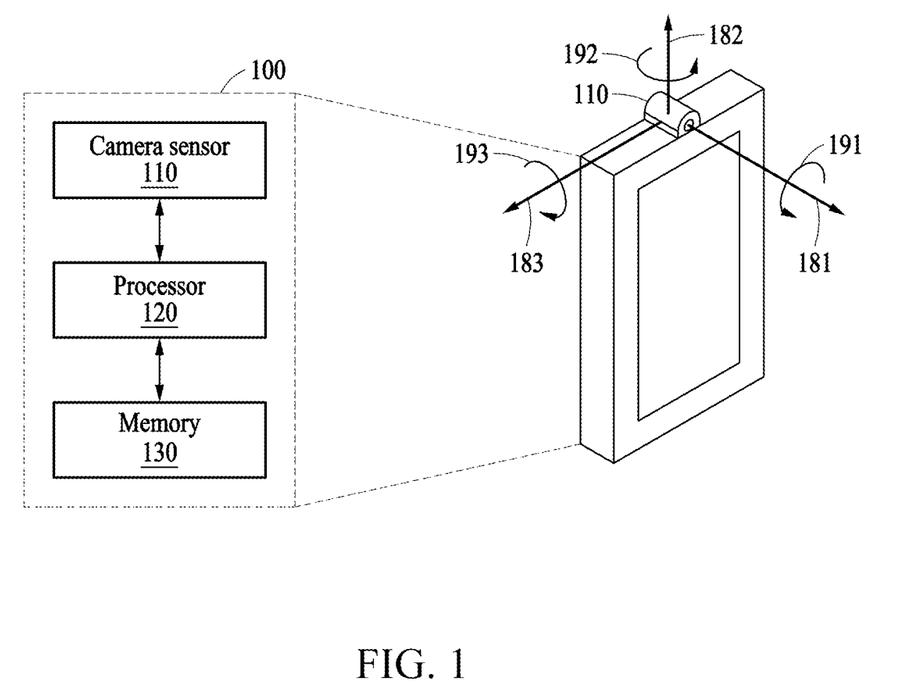
FIG. 1 illustrates an example of a configuration of an electronic device, according to one or more embodiments.

FIG. 1 illustrates an example of a configuration of an electronic device, according to one or more embodiments. An electronic device 100 may include a camera sensor 110, a processor 120, and a memory 130 (as used herein, "camera sensor" refers to a camera with an image sensor and does not refer to an image sensor per se). The electronic device 100 may recognize an object in an image captured using the camera sensor 110. The electronic device 100 may be, or may be included in, for example, a mobile device such as a smartphone, a tablet personal computer (PC), a notebook computer, a smart watch, etc., but example implementations are not limited thereto. The electronic device 100 may be, or may be included in, a stationary terminal such as a desktop PC, a kiosk terminal, a point-of-sale terminal, etc. In some implementations the electronic device 100 may be, or may be included in, a vehicle's advanced driver-assist system (ADAS) or autonomous driving (AD) system.

The camera sensor 110 may capture an image (e.g., a first image) of a scene. To do so, the camera sensor 110 may perform any camera motion, for example, any combination of rolling, panning, tilting, and zooming. The camera sensor 110 may perform a camera motion based on instruction from the electronic device 100. Herein, a camera or camera sensor capable of performing a camera motion may be referred to as a non-fixed camera, a movable camera, a steerable camera, or the like. For reference, a camera capable of performing a panning motion 192, a tilting motion 193, and a zooming motion may be referred to as a pan-tilt-zoom (PTZ) camera. As another example, the camera sensor 110 may be configured to be able to perform not only a PTZ motion but also a rolling motion 191. In some implementations, the camera sensor 110 is at least capable of performing panning or tilting motion, and may or may not be further capable of rotating and/or zooming.

For example, the camera sensor 110 may include mechanical structure (e.g., actuator(s), an electromagnetic force inducer, etc., servo(s), and/or an automated gimbal, etc.) capable of performing physical camera motions including the rolling motion 191, the panning motion 192, the tilting motion 193, and the zooming motion. In some implementations the camera sensor 110 is bodily incorporated in the electronic device 100 (e.g., a smartphone camera in a smartphone) and has capability to move relative to the electronic device 100. However, examples are not limited thereto, and the camera sensor 110 may be connected to another component (e.g., a housing) of the electronic device 100 through a mechanical structure capable of performing the above-described camera motions. As used herein, "camera" and "camera sensor" include any mechanism(s) that perform physical camera motion, even if such mechanism(s) are external to a housing or structure of the camera or camera sensor. For example, a camera or camera sensor includes a servo that might also be considered to be part of the structure of the electronic device 100. The camera sensor 110 may perform a camera motion in response to a command of the processor 120 (for purposes herein, such mechanical structure may be considered to be part of the camera sensor 110). The camera sensor 110 may perform a camera motion to change how a scene is captured, for example. As described below, the camera sensor 110 may operate to view and/or target an object by performing a camera motion, and such camera motion may be performed based on instruction from the electronic device 100.

A camera motion may be an operation of moving and/or changing any one or any combination of a direction of a principal axis (e.g., an optical axis), a field of view (FOV), and a scene of the camera sensor 110, and may also be referred to as a camera movement. In some implementations, the camera motion includes at least changing a direction of the optical axis (panning and/or tilting) of the camera and optionally also includes rotation of the camera about the optical axis (rolling) or zooming. For reference, a camera sensor may capture an image of a scene in line with a direction of the principal axis and the FOV of the camera sensor. The rolling motion 191, the panning motion 192, the tilting motion 193, and the zooming motion are described below as examples of camera motions, and a portion, shape, size, and/or location of a scene or object included in images captured by the image sensor 110 may be changed by the aforementioned camera motions.

The rolling motion 191 is a motion of rotating around a roll axis 181 of the camera sensor 110, and for example, the roll axis 181 may correspond to a principal axis (e.g., an optical axis) of the camera sensor 110. The camera sensor 110 to which the rolling motion 191 is applied may capture an image including a scene or object and rotate based on a reference point (e.g., a center point of the image). The rolling motion 191 may also be referred to as a Dutch motion. Object targeting through the rolling motion 191 will be described with reference to FIG. 4 below.

The panning motion 192 is a motion of rotating around a yaw axis 182 of the camera sensor 110, and the yaw axis 182 may be perpendicular to the roll axis 181 and a pitch axis 183. For example, as illustrated in FIG. 1, the yaw axis 182 is parallel to a vertical axis of the electronic device 100 (although any frame of reference may be used). A principal axis of the camera sensor 110 to which the panning motion 192 is applied rotates clockwise or counterclockwise around the yaw axis 182, and a scene or object captured by the camera sensor 110 may change accordingly. While a physical positional relationship between an object and the camera sensor 110 is fixed, when the panning motion 192 is applied to the camera sensor an object may shift horizontally within images captured during the panning motion 192. For example, in a first image captured by the camera sensor 110 before the panning motion 192 is applied, the object may be positioned at a first point. In a second image captured by the camera sensor 110 after a panning motion 192 of rotating clockwise around the yaw axis 182, the object may be shifted to a second point appearing on one side (e.g., left side) of the first point. As another example, after capturing the first image, in a second image captured by the camera sensor 110 after a panning motion 192 of rotating counterclockwise around the yaw axis 182, the object may be shifted to a second point appearing on another side (e.g., right side) of the first point. The panning motion 192 may also be a motion of the camera sensor 110 rotating from side to side (e.g., panning left-to-right-to-left or right-to-left-to-right). For reference, in most cases herein, a first image may be an image captured before a camera motion is applied, and a second image may be an image captured after a camera motion is applied.

A tilting motion is a motion of rotating about the pitch axis 183 of a camera. The pitch axis 183 may be perpendicular to the roll axis 181 and to the yaw axis 182. For example, as illustrated in FIG. 1, the pitch axis 183 is parallel to a horizontal axis of the electronic device 100 (regardless of orientation of the electronic device 100 relative to the physical horizon). A principal axis of the camera sensor 110 to which the tilting motion 193 is applied may rotate about the pitch axis 183. Similar to the panning motion 192 described above, when a first image is captured before the tilting motion 193 is applied, and when a second image is captured after the tilting motion 193 is applied, a point at which an object is positioned may shift in the images depending on a rotation direction of the tilting motion 193. For example, when the first image is captured by the camera sensor 110 before the tilting motion 193 is applied, the object may be positioned at a first point. In the second image captured by the camera sensor 110 after the tilting motion 193 of rotating in a first rotation direction (e.g., rotating from a downward-looking direction to an upward-looking direction) around the pitch axis 183, the object may be shifted to a second point appearing on one side (e.g., lower side) of the first point. As another example, when the second image is captured by the camera sensor 110 after the tilting motion 193 of rotating in a second rotation direction (that is opposite to the first rotation direction) around the pitch axis 183, the object may be shifted to a second point appearing on another side (e.g., upper side) of the first point. The tilting motion 193 may also be a motion of the camera sensor 110 moving and/or rotating up and down (e.g., relative to the electronic device 100).

The aforementioned roll axis 181, yaw axis 182, and pitch axis 183 may vary according to a design and a mode (e.g., a portrait mode and a landscape mode) of the electronic device 100. The axes may be oriented to any frame of reference. For example, the frame of reference may be oriented to an expected orientation of the electronic device 100 while being used by a user. For example, the frame of reference (the axes) may be oriented in relation to the motion capabilities of the camera sensor 110, regardless of how the camera sensor 110 is mounted on the electronic device 100 and regardless of the orientation of the electronic device 100 relative to the horizon.

The zooming motion may be a motion of changing a focal length of an optical system including one or more lenses included in the camera sensor 110 (e.g., changing a distance between a light sensor of the camera sensor 110 and a lens of the camera sensor 110). The zooming motion may include a zoom-in motion of enlarging an object in an image and a zoom-out motion of reducing an object in an image. The zooming motion may also be performed by swapping lenses of the camera sensor 110.

However, a camera motion is not limited to what will be described later, and may include a motion (e.g., pedestal, dolly, truck, robotic arm, etc.) of moving linearly along one axis, according to an example design.

The processor 120 may control any camera motion or any combination of rolling, panning, tilting, and zooming based on a result of detecting an object in a first image. The control may be implemented, for example, by providing commands, signals, executable instructions, etc. to the camera sensor 110. The processor 120 may capture a second image using the camera sensor 110 as adjusted by camera motion thereof. The processor 120 may recognize an object in the captured second image. However, an operation of the processor 120 is not limited to those described above and will be further described with reference to FIGS. 2 to 7.

A physical object to be captured may be any physical information able to be recognized, and for example, an object may be a pattern code, a document, a face, etc. A pattern code is a code having a pattern that, by convention, represents or encodes information, and may be physically implemented, for example, as a two-dimensional figure in the form of a barcode or a quick response (QR) code, for example. However, examples are not limited thereto, and a pattern code may also be implemented as a hologram code, a three-dimensional or higher-dimensional figure, etc. A document may include a character and/or a figure (e.g., a graphic icon) representing information. The physical object may be an etched and/or bas relief pattern, figure, shape, etc. on a physical surface, for example.

The electronic device 100 may detect an object in a first image and/or a second image captured using the camera sensor 110 and may recognize the detected object (e.g., in a second image). Object recognition may include an operation of identifying, reading, and extracting information contained in an object (e.g., decoding the object). Regarding pattern codes, a QR code may be recognized based on detection of a quadrilateral shape, detection of a physical positioning mark in an area corresponding to the detected quadrilateral shape, and identification of a combination of individual cells (e.g., black and white quadrilateral elements) containing information. Information (e.g., a series of characters and numbers) contained in a document may be recognized based on optical character recognition (OCR). However, use of OCR is not limited to recognizing information in a document. The electronic device may detect various objects on which characters and/or numbers are printed and/or drawn in/on contexts other than a document and may perform OCR on the corresponding objects. For example, the electronic device may detect objects etched in (or protruding in relief from) any type of physical surface or object. For example, the electronic device may detect braille characters on a surface, opaque or semi-opaque features within a transparent/semi-transparent medium, etc.

A result of detecting an object may be any information related to the detected object, and such information may include any one, or any combination of, a shape, a detection state, a pose/orientation, a position, and/or an object category of the object detected in an image. For example, the information related an object (e.g., a barcode, a QR code, or a document) may be a quadrilateral, an internal angle of the object, etc. A detection result may be a detection state indicating whether a full shape of an object is detected or only a partial shape of an object is detected. An object category may indicate the type of object among a barcode, a QR code, and a document, for example. An object category may be determined, for example, using object recognition on a detected object.

The memory 130 may store instructions that, when executed by the electronic device 100, may cause the electronic device 100 to perform a method of recognizing an object. The memory 130 may store a first image captured before a camera motion is applied and may store a second image captured after a camera motion is applied. In addition, the memory 130 may store a result of detecting an object in the first image and a result of recognizing the object in the second image. A result of recognizing an object may include information obtained by recognizing an object containing information, e.g., in encoded form. Information contained in a QR code may be read from a combination of cells or elements of the QR code. Information contained in a barcode may be read from a combination of margins, narrow bars, and/or wide bars. Information may also be encoded in (and decoded from) colors of the object. Information contained in a document may be read based on optical recognition of a character, a number, and/or a figure contained in the document.

The electronic device 100 may automatically control/perform a camera motion of the camera sensor 110 (e.g., a PTZ camera) based on a result (e.g., a shape of an object, etc.) of automatically detecting an object in a first image, thereby obtaining a second image wherein the object may be captured more clearly, more completely, with less distortion, and/or with less blur, for example, relative to the object in the first image. As described above, the electronic device 100 may determine an intention (e.g., an intention to recognize an object in a desired category) of a user or an application (e.g., from a user selection, from the application itself, etc.) and based thereon may invoke rapid object scanning using any PTZ motions and/or rolling motion 191 of the camera sensor 110. In other words, the electronic device 100 may provide an accurate object recognition result without necessarily requiring (or in spite of) a user manually repositioning/reorienting the camera sensor 110 relative to the object (e.g., by manually moving the electronic device 100). Accordingly, a number manual manipulations or steps required by a user to have the electronic device 100 recognize an object may be reduced to as low as one. Also, the electronic device 100 may improve user convenience when performing object recognition.

Figure 2:
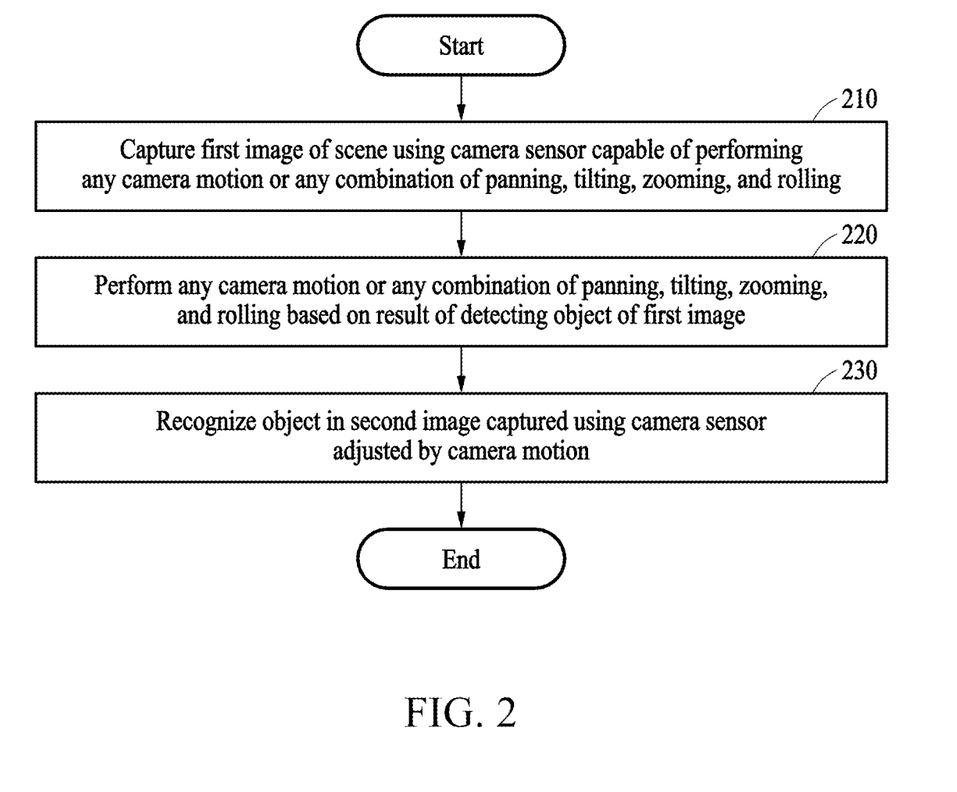
FIG. 2 illustrates an example of a method of recognizing an object, according to one or more embodiments.
Figure 3:
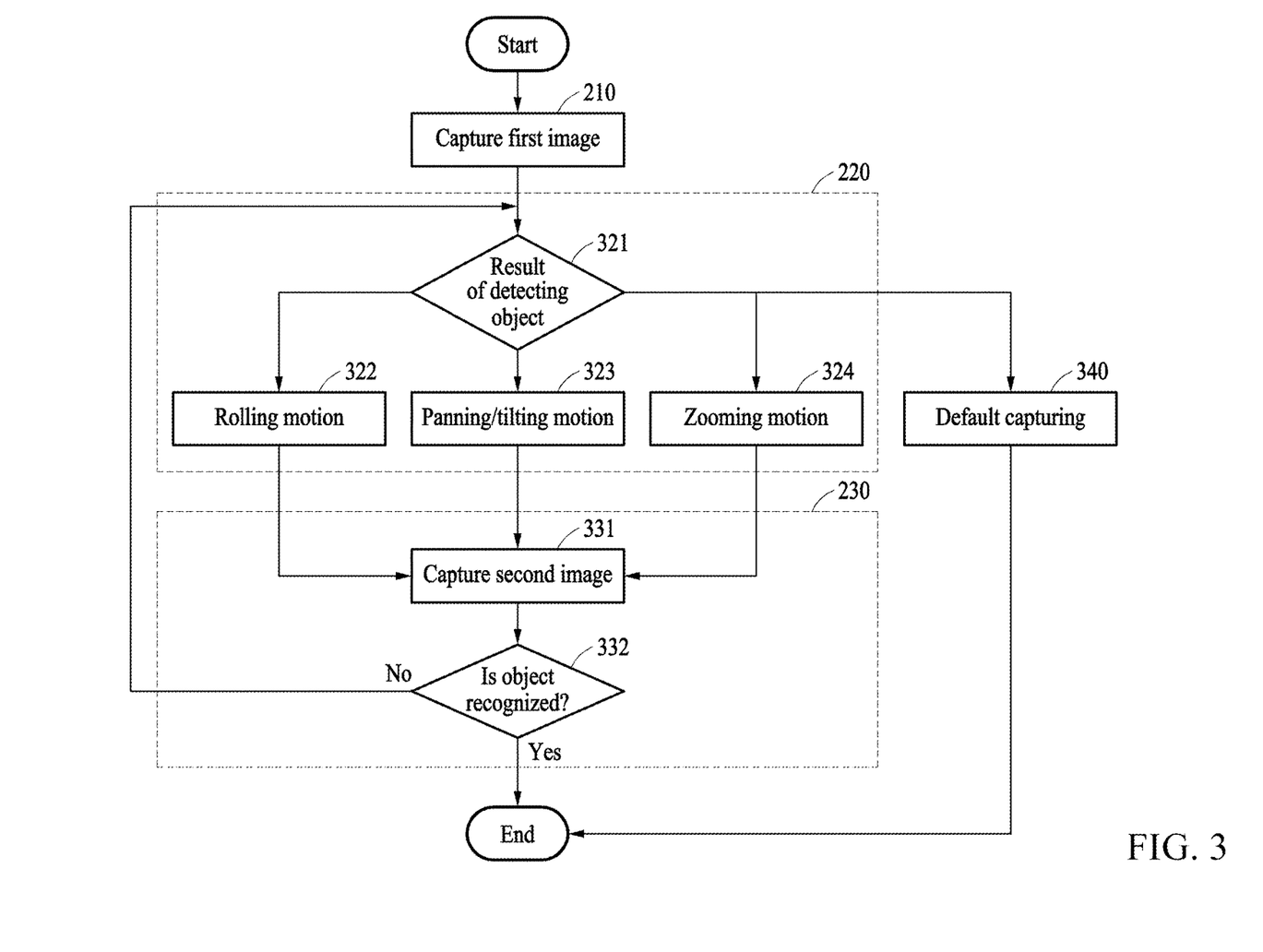
FIG. 3 illustrates an example of a method of recognizing an object, according to one or more embodiments.

FIGS. 2 and 3 illustrate examples of a method of recognizing an object, according to one or more embodiments. First, in operation 210, an electronic device (e.g., the electronic device 100 of FIG. 1) may capture a first image of a scene using a camera sensor capable of performing any camera motion or any combination of panning, tilting, zooming, and rolling. The camera need not be capable of all types of motions and may, for example, only be capable of performing one of the types of camera motions described herein, for example. Moreover, as discussed above, in some implementations, the mechanism(s) for performing camera motion(s) may be external to the camera.

A camera sensor may capture a scene or object with a default parameter. For example, a default parameter may be a parameter that sets a principal axis and an FOV of a camera sensor to each be in a default state. A default state may be, for example, a state in which the principal axis of the camera sensor is aligned in parallel with a reference axis of the electronic device. That reference axis of the electronic device may be, for example, an axis perpendicular to a display plane. In other words, a camera sensor arranged with a default parameter setting may face a front direction (e.g., a direction facing a display) of the electronic device and may capture a first image of a scene or object corresponding to the front direction.

Next, in operation 220, the electronic device may perform any camera motion or any combination of the panning, the tilting, the zooming, and the rolling based on a result of detecting an object in the first image. For example, in operation 321, the electronic device may obtain a result of detecting the object in the first image. The electronic device may determine, for example, a shape of the object, a state of the object, and/or an indication of whether the first image includes an object. The electronic device may determine a camera motion to be performed based on the object detection result. For example, the electronic device may select any one of, or any combination of, a rolling motion, a panning motion, tilting motion, and/or a zooming motion based on a shape, state, size of the detected object in an image, location of the object, and/or a distance to the object. The electronic device may also determine a motion parameter for a selected camera motion, or a camera motion combination based on the object detection result. A motion parameter may include a rolling angle, a panning angle, a tilting angle, and/or a zoom magnification.

For example, in operation 322, the electronic device may perform a rolling camera motion based on the object detection result. For example, in response to an object captured in an image being in a specific rotation state, the electronic device may instruct the camera sensor to perform a corresponding rolling motion. An example of performing a rolling motion will be described below with reference to FIG. 4. As another example, in operation 323, the electronic device may perform a panning motion and/or a tilting motion. In response to the captured object being determined to be tilted or distorted, the electronic device may instruct the camera sensor to perform the panning motion and/or the tilting motion. An example of performing a panning motion and/or a tilting motion will be described below with reference to FIG. 5. As yet another example, in operation 324, in response to a captured object deviating from a scanning distance, the electronic device may instruct the camera sensor to perform a zooming motion. A scanning distance is a distance range in which the electronic device may recognize an object. A scanning distance from the electronic device to an object may be set differently depending on a physical size of the object. A scanning distance may also be referred to as a scanning distance range. A scanning distance will be described below with reference to FIG. 6. A principal axis of the camera sensor may be moved or steered toward a center of an object by the above-described motions, and an FOV of the camera sensor may be aligned to include the entire object.

For reference, in operation 321, as a result of detection of the object in the first image, the electronic device may determine whether the object in the first image may be susceptible to being recognized. The electronic device may recognize the object in the first image captured based on default capturing (e.g., capturing using a camera sensor set with a default motion parameter) in operation 340 in response to determining that it is possible to recognize the object in the first image.

In operation 230, the electronic device may recognize an object in a second image captured using a camera sensor that has been adjusted by a camera motion. For example, in operation 331, the electronic device may capture a new image (e.g., a second image) using a camera sensor to which a camera motion according to above-described operations 322, 323, and 324 has been applied. A principal axis and/or an FOV may change according to a camera motion, and thus a scene of the first image and a scene of the second image may be different. A visual representation of an object in the second image may have a position, size, and shape aligned, for example with a display of the electronic device, compared to a visual representation indicating an object in the first image. For example, the electronic device may capture the second image and in the second image an object may be positioned at or near a center of a scene compared to the first image. In operation 332, the electronic device may perform object recognition based on the captured second image. For example, the electronic device may extract information contained or encoded in the object included in the second image based on barcode recognition, QR code recognition, or OCR recognition, for example. In response to the recognition not being successful the electronic device may return to operation 321, perform object detection again, and perform a new camera motion based on the object detection result. In other words, operations may be repeated with the second age newly serving as the first image and a new image serving as the second image.

When scanning a barcode, a QR code, or a document using a camera sensor, the electronic device may perform accurate scanning with fewer operations by aligning the camera sensor toward an object through the camera motions described above. In other words, the electronic device may, for example, align a principal axis and an FOV of the camera sensor toward an object having a text and/or a pattern code by applying a camera motion without, or in spite of, a user moving the camera manually, for example as a result of manually moving the electronic device.

According to the above-described examples, the electronic device may identify a category of an object detected in the first image based on an object detection result. For example, in response to detecting a predefined shape (e.g., a quadrilateral) in the first image, the electronic device may determine that an object exists. In response to detecting a mark (e.g., a positioning mark of a QR code) related to a pattern code in an area (e.g., a quadrilateral area) corresponding to a shape of a detected object, the electronic device may identify a category of the object as being a pattern code. As another example, in response to a character and/or a number being detected in the area corresponding to the shape of the detected object, the electronic device may identify the category of the object as being a document or text. However, these are non-limiting examples and the electronic device may determine a category of an object using other techniques, for based on a user input, a type of active application, recent user activity, a setting of the electronic device, etc. For example, the electronic device may select a document or a pattern code as a category of an object-to-be-recognized in the first image based on a user input. Accordingly, the electronic device may select a category that corresponds to an intention of a user based on an automatic determination and/or a manual input, and may detect and recognize an object corresponding to the selected category in the first image and/or the second image.

Figure 4:
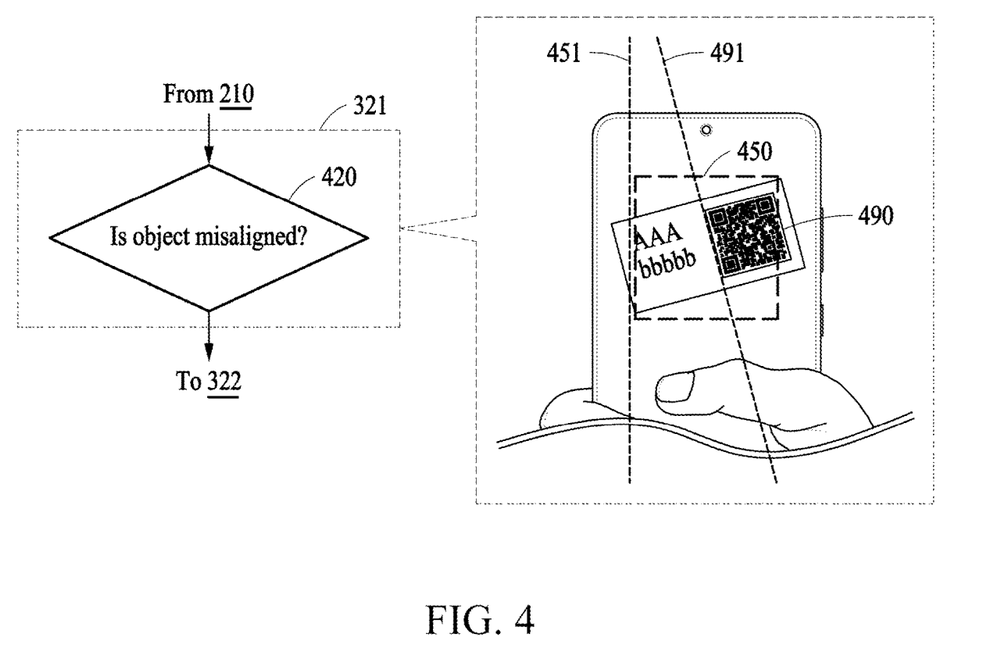
FIG. 4 illustrates an example of performing a rolling motion, according to one or more embodiments.

FIG. 4 illustrates an example of performing a rolling motion, according to one or more embodiments. In operation 420, an electronic device (e.g., the electronic device 100 of FIG. 1) may determine whether an object 490 is misaligned. A processor of the electronic device may perform a rolling motion in response to the object 490 detected in a first image being misaligned relative to a camera sensor. The electronic device may use standard image analysis techniques to detect a line of the object 490, for example a first reference line

491. The electronic device may determine an angle between the first reference line 491 and a reference line of a frame of reference, for example a second reference line 451 of a target area 450. For example, the electronic device may, according to the angle, instruct the camera sensor to perform a rolling motion of rotating about a roll axis corresponding to a principal axis of the camera sensor so that the first reference line 491 (and therefore the object 490) in a subsequent second image and the second reference line 451 of the target area 450 are substantially aligned in the second image (within some threshold difference, e.g., five degrees or whatever may be practical for a given application). The visual representation indicating the object 490 may be output on a display of the electronic device. The target area 450 may be, for example, an area where the object 490 is supposed to be positioned to be recognized, and may be a partial display area or an entire display area. As illustrated in FIG. 4, in some examples, the target area 450 is a partial area of the display corresponding to an image area within which object recognition may be performed.

The first reference line 491 and the second reference line 451 may be lines serving as a reference for alignment between the image representation of the object and the target area 450. In the example of FIG. 4, the first reference line 491 is a straight line corresponding to an edge of a shape (e.g., a quadrilateral) of the visual/image representation, and the second reference line 451 is a straight line corresponding to an edge of the target area 450, but examples are not limited thereto. In the above-described example, the electronic device may determine that the object 490 is misaligned relative to the camera sensor based on an angular difference between the first reference line 491 of the visual representation and the second reference line 451 of the target area 450 in the first image being greater than a first threshold angle. Other reference lines (e.g., edges, contour lines, etc.) may be used for other applications.

The electronic device may determine a camera motion parameter based on a detection result. For example, the electronic device may determine the camera motion parameter based on the angular difference between the first reference line 491 of the visual representation and the second reference line 451 of the target area 450 in the first image. The electronic device may calculate a rolling parameter based on the angular difference between the first reference line 491 and the second reference line 451. The rolling parameter is a parameter indicating an extent to which the camera sensor performs a rolling motion, and may include, for example, a rolling angle. The rolling angle may be an angle at which the camera sensor rotates around the roll axis from a default angle (e.g., an angle at which the camera sensor faces frontwards and the electronic device and camera are both vertically oriented). The electronic device may determine that the visual representation of the above-described object 490 is aligned with the target area 450 in response to the angular difference between the first reference line 491 and the second reference line 451 being less than or equal to the first threshold angle. In some embodiments, a camera motion parameter (whether for a rolling motion or otherwise) may be in the form of instructions (or translate to instructions) generated by the electronic device and sent as control signals or function calls to the camera sensor, e.g., through a device driver, a hardware interface, a bus, etc.

Misalignment of the object 490 with respect to the camera sensor may increase the time it takes for the electronic device to recognize the object 490. The electronic device may improve the speed and/or accuracy of object recognition by performing object recognition using the second image obtained by aligning an FOV of the camera sensor with the object 490 using the aforementioned rolling motion.

Figure 5:
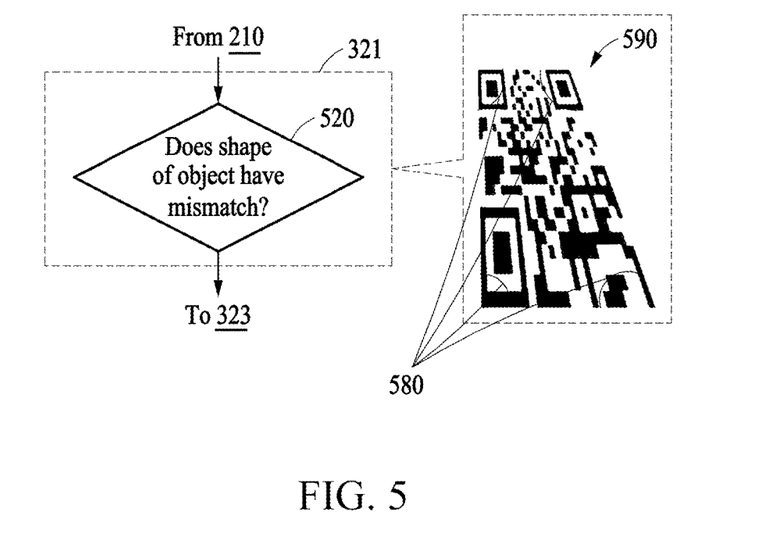
FIG. 5 illustrates an example of performing a panning motion and/or a tilting motion, according to one or more embodiments.

FIG. 5 illustrates an example of performing a panning motion and/or a tilting motion, according to one or more embodiments. In operation 520, an electronic device (e.g., the electronic device 100 of FIG. 1) may determine whether (or an extent to which) a shape of an object 590 is mismatched with a reference shape. In response to a shape of a visual representation of the object 590 in a first image being mismatched with a predetermined reference shape of a category identified for the object 590, a processor of the electronic device may perform panning and/or tilting. For example, the electronic device may instruct a camera sensor to perform a panning motion of rotating around a yaw axis of the camera sensor and a tilting motion of rotating around a pitch axis of the camera sensor, when, for example, a visual representation of the object 590 in a second image is a quadrilateral (each internal angle of the quadrilateral may be a reference angle).

In the above-described example, the shape of the object 590 when the object 590 is a pattern code, such as a QR code, or a document may be a quadrilateral. In response to an angular difference between at least one of the internal angles 580 (of the visual representation of the object 590) and a reference angle (e.g., 90 degrees) being greater than a second threshold angle (which may vary according to implementation and application), the electronic device may determine that the shape of the object 590 is mismatched with the reference shape. In some implementations, a threshold angle may be learned by the electronic device.

The electronic device may determine a motion parameter based on a detection result. For example, the electronic device may determine a motion parameter based on an angular difference between each internal angle of the visual representation of the object 590 in the first image and the reference angle. The electronic device may calculate a tilting parameter and/or a panning parameter based on a difference between an internal angle and the reference angle (or multiple such differences). For example, the electronic device may calculate a tilting parameter and/or a panning parameter that minimizes a sum of differences between each of the four internal angles 580 and the reference angle. The tilting parameter is a parameter indicating an extent to which the camera sensor performs a tilting motion, and may include, for example, a tilting angle. The tilting angle may be an angle that the camera sensor rotates about a pitch axis from a default angle. The panning angle may be an extent to which the camera sensor rotates around a yaw axis from a default angle. In one example, in response to the sum of differences between each of the four internal angles 580 and the reference angle being less than or equal to the second threshold angle, the electronic device may determine that the visual representation of the object 590 sufficiently matches the reference shape and tilting and/or panning may not be performed (or may stop being performed).

Figure 6:
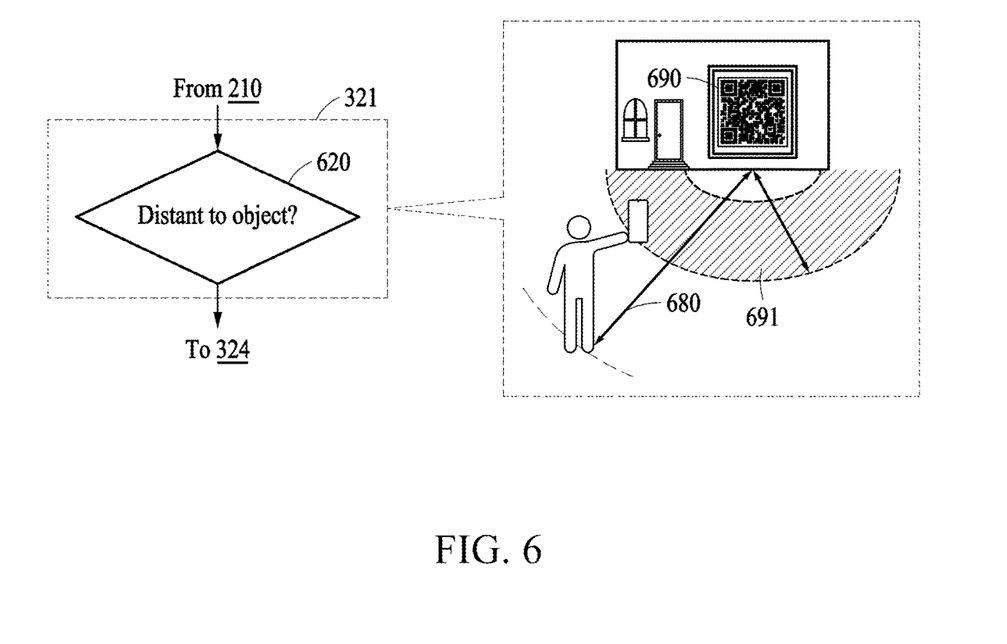
FIG. 6 illustrates an example of performing a zooming motion, according to one or more embodiments.

FIG. 6 illustrates an example of performing a zooming motion, according to one or more embodiments. In operation 620, an electronic device may estimate a distance 680 to an object 690. Based on the distance 680 to the object 690, the electronic device may determine whether the distance 680 falls outside a scanning distance corresponding to a size of the object 690. The electronic device may estimate the distance 680 from the electronic device to the object 690 based on a zoom magnification of the camera sensor and an area occupied by the detected object 690 in the first image, for example. As another example, the electronic device may also measure the distance 680 to the object 690 using a distance sensor (e.g., a time of flight (ToF) sensor, an infrared sensor, a lidar sensor, a radar sensor, or an ultrasonic sensor).

The scanning distance may be, for example, a distance at which the electronic device may recognize the object 690 using a default zoom magnification, and the scanning distance from the electronic device to the object 690 may be set differently according to a physical size of the object 690 (as determined by image analysis, for example). The default zoom magnification may be, for example, a 1× zoom. For example, a scanning distance may be 25 centimeters (cm) at a default zoom magnification for a QR code having a size of 2 cm. A scanning distance may be greater than or equal to 45 cm and less than or equal to 75 cm at a default zoom magnification for a QR code (e.g., a QR code printed on a magazine or a catalog) having a size of greater than or equal to 6 cm and less than or equal to 15.8 cm. As another example, a scanning distance may be greater than or equal to 1.2 meters (m) and less than or equal to 7.6 m at a default zoom magnification for a QR code (e.g., a QR code displayed on a poster or a window) having a size of greater than or equal to 16 cm and less than or equal to 75 cm. As yet another example, a scanning distance may be greater than or equal to 3.6 m and less than or equal to 7.6 m at a default zoom magnification for a QR code having a size of greater than or equal to 48 cm and less than or equal to 157 cm. However, the above-described scanning distances are merely examples and the scanning distance (or range) may vary according to a design or application. In addition, a scanning distance may vary according to a zoom magnification. Alternatively, a QR code is not limited to being disposed on the above-described object 690, and may be output through a display, attached to a shop window, or located in a vehicle.

The electronic device may perform zooming based on at least one of a distance to a physical position of the object 690 detected in the first image and a size of the object 690. As described above, a scanning distance recognizable by the electronic device may vary according to the size of the object 690. The electronic device may determine whether the distance to the physical position of the object 690 falls outside a scanning distance range 691 corresponding to the size of the object 690 detected in the first image. The electronic device may perform the zooming motion based on the distance 680 to the object 690 falling outside the scanning distance range 691.

For example, the electronic device may instruct the camera sensor to perform a zoom-in motion so that an area occupied by the visual representation indicating the object 690 in a second image has a ratio greater than a threshold ratio of a target area (e.g., an object-recognition area). The electronic device may increase a size of the visual/image representation of the object 690 in the second image by performing the zoom-in motion based on the visual representation indicating the object 690 in the first image occupies an area having a ratio less than or equal to the threshold ratio of the target area. Accordingly, the visual representation indicating the object 690 may be enlarged in a second image after the zoom-in. The electronic device may continue performing the zoom-in motion, image capture, and image evaluation until the area of the visual representation of the object 690 is greater than an area corresponding to the threshold ratio of the target area. The electronic device may stop performing the zoom-in motion (and image capture and evaluation) in response to the area of the visual representation of the object 690 being greater than the area corresponding to the above-described threshold ratio. The object 690 captured in the first image appears small because the object 690 is too far away from the electronic device, and thus the electronic device may obtain the second image by enlarging a sensing area corresponding to the object 690 to a size suitable for recognition by performing the zoom-in motion as described above and then capturing the enlarged object 690 in a subsequent image that may be used for object recognition.

As another example, the electronic device may instruct the camera sensor to perform a zoom-out motion based determining that only a portion of the object 690 is detected (e.g., by determining that a portion of the object 690 is missing from the first image). If the object 690 is too close to the electronic device, the target area and/or the second image may include only a portion of the object 690 and another portion (e.g., a remaining portion) may be missing or may deviate from the target area. The electronic device may obtain the second image in which a full shape of the object 690 is captured by instructing the camera sensor to perform the zoom-out motion as described above.

Accordingly, even if the distance 680 to the object 690 falls outside the scanning distance range 691 at a current (e.g., default) zoom magnification, it may not be necessary to change a physical distance between the object 680 and the electronic device, and thus, without having to be moved by a user, the electronic device may accurately recognize the object 690 in response to the object 690 being captured at a size suitable for recognition through performing the zoom motion.

For reference, the description of the example above includes a description of the zoom motion based on the distance 680 to the object 690, but examples are not limited thereto. The electronic device may calculate a zooming parameter of the zooming motion based on the area of the visual representation of the object 690 detected in the first image. For example, the electronic device may calculate a zooming parameter (e.g., a zoom magnification) in which the area of the visual representation of the object 690 in the second image will be included in a target area range.

Figure 7:
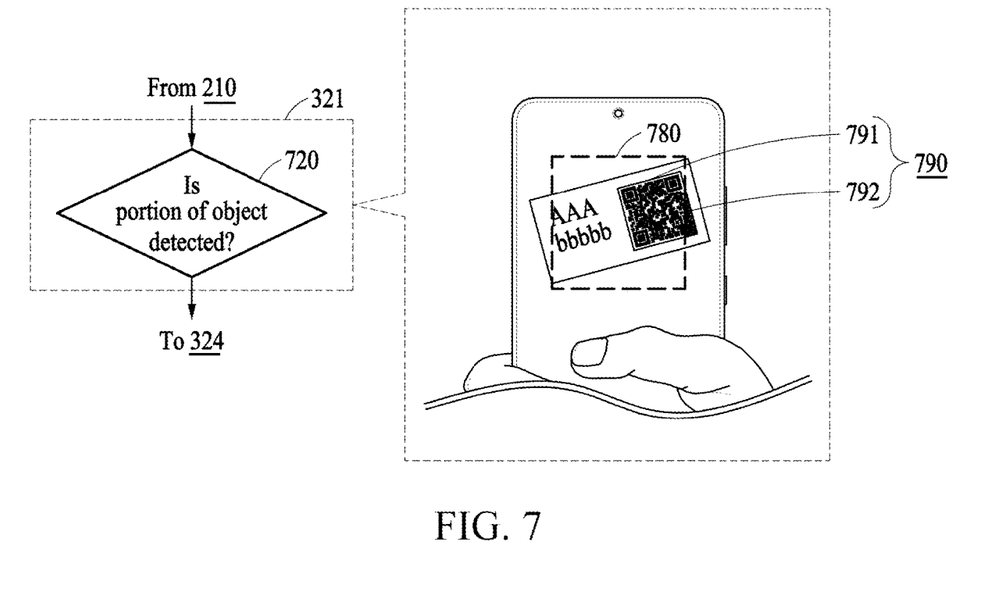
FIG. 7 illustrates an example of an operation of using a camera having a wide-angle lens, according to one or more embodiments.

FIG. 7 illustrates an example of an operation of using a camera having a wide-angle lens, according to one or more embodiments. An electronic device may further include another camera sensor (e.g., a wide-angle camera) having a wider FOV than a camera sensor to be used for object recognition (e.g., the camera sensor 110 of FIG. 1).

In operation 720, the electronic device may determine whether only a portion of an object 790 is detected in a first image. For example, the electronic device may determine whether a portion 791 of the object 790 is included in a target area 780 in the first image and another portion 792 (e.g., a remaining portion) is absent from (or out of) the target area 780. In response to detecting the portion 791 of the object 790 in a second image, the electronic device may capture the second image using another camera sensor. Accordingly, the electronic device may capture the second image and a full shape of the object 790 may be included in the target area 780. The electronic device may detect and recognize the object 790 included in the second image.

FIG. 7 illustrates an example in which the electronic device further includes the wide-angle camera, but examples are not limited thereto, and the electronic device may further include a telephoto camera. If a distance to an object is longer than the scanning distance described with reference FIG. 6 and if it is impossible to enlarge the object to a size suitable for recognition by performing the zoom-in motion with a PTZ camera, for example, then the electronic device may capture the second image related to the object using the telephoto camera.

For reference, FIGS. 4 to 7 illustrate examples of performing image analysis and corresponding camera motions one by one, but examples are not limited thereto. Any of the camera motions described above with reference to FIGS. 4 to 7 may be performed in parallel with each other (or other camera motions) or may be performed in a time-series manner. For example, the electronic device may instruct a camera sensor to perform any camera motion or any combination of a rolling motion, a panning motion, a tilting motion, and a zooming motion. The electronic device may perform a camera motion so that a principal axis of the camera sensor targets an object. The electronic device may determine a camera motion parameter so that an angular error between an internal angle of a quadrilateral shape of an object and a reference angle and/or an error between reference lines are minimized within a range in which the full shape of the object falls within an FOV of a camera sensor or an object-recognition area of an application.

In some embodiments, motion of the electronic device may be incorporated into any of the camera motion calculations described herein. When a first image is captured and an object is detected therein, a camera motion may be calculated as described above. After the first image is captured, one or more sensors of the electronic device may detect a change in orientation of the electronic device relative to a physical frame of reference. Due to the physical incorporation (or attachment) of the camera to the electronic device, the change in orientation of the electronic device corresponds to a change in orientation of the camera relative to the physical frame of reference. The change in orientation of the device/camera relative to the physical frame of reference may be accounted for in the camera motion calculation.

For example, if the object in the first image is determined to be to the left side of the first image and a pan-left camera motion (e.g., pan left 30 degrees) is calculated to center the object in a second image, and if, after the first image is captured, a sensor (e.g., a motion sensor, gyroscope, secondary camera, etc.) of the electronic device provides a signal indicating that the electronic device has re-reoriented to point/face rightward (e.g., 20 degrees to the right), the pan-left motion may be calculated (or re-calculated) to account for the reorientation of the electronic device (e.g., the pan-left motion may be calculated to be 30 degrees plus 20 degrees).

Similarly, a camera motion determined, from a first image, to be suitable for object recognition in a second image may be reduced if the electronic device has incidentally been reoriented to face closer to the object; the camera motion may be correspondingly reduced to offset the incidental motion/reorientation of the electronic device.

In sum, any type of camera motion(s) calculated for recognizing a detected object as described above may be based on both a camera motion determined to be needed for object recognition in a second image (assuming a constant pose of the electronic device) and may also be based on a sensed motion/reorientation of the electronic device containing the camera. Put another way, any automatically determined camera motion described above may be adjusted or supplemented to compensate for detected motion of the electronic device.

The electronic devices, the computing apparatuses, the vehicles, the electronic devices, the processors, the memories, the image sensors, the vehicle/operation function hardware, the advanced drive-assist systems (ADAS), autonomous driving (AD) systems, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device, comprising: a camera sensor configured to capture a first image of a scene, wherein the camera sensor is configured to perform at least one type of physical camera motion relative to the electronic device, wherein the at least one type of physical camera motion comprises rolling, panning, tilting, or zooming the camera sensor relative to the electronic device; and a processor configured to: control the camera sensor to perform a physical motion of the physical camera motion type based on detecting an object in the first image, including controlling the camera sensor based on a shape of the object in the first image being mismatched with a reference shape associated with the object in the first image, acquire a second image captured using the camera sensor as adjusted based on the performed physical motion, and recognize the object in the second image, wherein, for the controlling the camera sensor, the processor is further configured to control the panning or tilting so that an internal angle of a shape of the object in the second image matches a reference angle, and wherein the panning comprises rotating about a yaw axis of the camera sensor and wherein the tilting comprises rotating about a pitch axis of the camera sensor.

2. The electronic device of claim 1, wherein the physical motion comprises rolling, and wherein the processor is further configured to control the rolling based on alignment of the object in the first image relative to the camera sensor.

3. The electronic device of claim 2, wherein the rolling comprises rotating about a roll axis corresponding to a principal axis of the camera sensor so that a first reference line of the object in the second image and a second reference line of a target area are aligned.

4. The electronic device of claim 1, wherein the physical motion comprises the panning or tilting, and wherein the processor is further configured to control the panning or tilting based on the shape of the object in the first image being mismatched with a reference shape of a category corresponding to the object in the first image.

5. The electronic device of claim 1, wherein the physical motion comprises zooming and wherein the processor is further configured to control the zooming based on a distance to a physical position of the object or a size of the object in the first image.

6. The electronic device of claim 5, wherein the zooming comprises a zoom-in motion and wherein the processor is further configured to control the zoom-in motion so that an area occupied by the object in the second image has a ratio greater than a threshold ratio of a target area.

7. The electronic device of claim 5, wherein the processor is further configured to control the zoom-out motion based on determining that the object in the second image is incomplete or is partially outside of an area for object recognition.

8. The electronic device of claim 1, further comprising:
another camera sensor having a wider field of view than the camera sensor,
wherein the processor is further configured to obtain the second image using the other camera sensor based on a determination corresponding to a portion of the object being absent from the second image or from a sub-area of the second image.

9. The electronic device of claim 1, wherein the processor is further configured to select a document or a pattern code as a category to be recognized in the first image or the second image based on an input from a user input device.

10. A method performed by an electronic device, the method comprising: accessing a first image of a scene captured using either a first camera configured to perform at least one automated camera motion or using a second camera, the automated camera motion comprising rolling, panning, tilting, or zooming; performing the automated camera motion of the first camera based on a detected location and/or orientation of an object detected in the first image, including controlling the first camera based on a shape of the object in the first image being mismatched with a reference shape associated with the object in the first image; accessing a second image captured using the first camera as adjusted based on the performed automated camera motion; and recognizing the object in the captured second image, wherein the controlling the camera sensor further includes controlling the panning or tilting based on the shape of the object in the first image being mismatched with a reference shape of a category corresponding to the object in the first image so that an internal angle of a shape of the object in the second image matches a reference angle, and wherein the panning comprises rotating about a yaw axis of the camera sensor and wherein the tilting comprises rotating about a pitch axis of the camera sensor.

11. The method of claim 10, wherein the performing of the automated camera motion comprises performing rolling based on the object in the first image being misaligned relative to the first camera.

12. The method of claim 11, wherein the performing of the rolling comprises instructing the first camera to perform a rolling motion of rotating around a roll axis corresponding to a principal axis of the first camera so that a first reference line of the object in the second image and a second reference line become aligned.

13. The method of claim 10, wherein the automated camera motion comprises zooming based on a physical distance of the object or a size of the object in the first image.

14. The method of claim 13, wherein the zooming comprises a zoom-in motion performed so that a ratio of an area corresponding to the object in the second image is greater than a threshold.

15. The method of claim 13, wherein the zooming comprises instructing the first camera to perform a zoom-out motion based on a determination corresponding to a portion of the object being missing.

16. The method of claim 10, wherein the first image is captured using the second camera, and wherein the second camera has a wider field of view than the first camera.

17. A non-transitory computer-readable storage medium storing instructions that, when executed by a processor, cause the processor to perform the method of claim 10.

* * * * *